(12) United States Patent
Han et al.

(10) Patent No.: US 12,317,310 B2
(45) Date of Patent: May 27, 2025

(54) METHOD AND APPARATUS FOR SIDELINK SCHEDULING REQUEST AND BUFFER STATUS REPORT TRANSMISSION

(71) Applicant: Lenovo (Beijing) Limited, Beijing (CN)

(72) Inventors: Jing Han, Chaoyang District (CN); Lianhai Wu, Chaoyang (CN); Haiming Wang, Xicheng District (CN); Jie Hu, Changping District (CN)

(73) Assignee: Lenovo (Beijing) Limited, Beijing (CN)

( * ) Notice: Subject to any disclaimer, the term of this patent is extended or adjusted under 35 U.S.C. 154(b) by 274 days.

(21) Appl. No.: 17/625,045

(22) PCT Filed: Jul. 8, 2019

(86) PCT No.: PCT/CN2019/095136
§ 371 (c)(1),
(2) Date: Jan. 5, 2022

(87) PCT Pub. No.: WO2021/003645
PCT Pub. Date: Jan. 14, 2021

(65) Prior Publication Data
US 2022/0295511 A1    Sep. 15, 2022

(51) Int. Cl.
*H04W 72/566* (2023.01)
*H04W 72/02* (2009.01)
(Continued)

(52) U.S. Cl.
CPC ......... *H04W 72/569* (2023.01); *H04W 72/02* (2013.01); *H04W 72/1263* (2013.01); *H04W 80/02* (2013.01); *H04W 92/18* (2013.01)

(58) Field of Classification Search
CPC ............... H04W 72/569; H04W 72/02; H04W 72/1263; H04W 80/02; H04W 92/18; H04W 72/20; H04W 72/52
See application file for complete search history.

(56) References Cited

U.S. PATENT DOCUMENTS

| | | | |
|---|---|---|---|
| 2016/0128094 A1* | 5/2016 | Lee | ........................ H04W 72/21 370/329 |
| 2016/0135217 A1* | 5/2016 | Lee | ......................... H04L 47/30 370/329 |

(Continued)

FOREIGN PATENT DOCUMENTS

| | | |
|---|---|---|
| CN | 109587806 A | 4/2019 |
| WO | WO2017165198 A1 | 9/2017 |
| WO | 2020221246 A1 | 11/2020 |

OTHER PUBLICATIONS

Ericsson, "gNB-Scheduled Resource Allocation for Sidelink", 3GPP TSG-RAN WG2 #106, TDoc R2-1907354, Reno, USA, May 13-17, 2019 (Year: 2019).*

(Continued)

*Primary Examiner* — Chae S Lee
(74) *Attorney, Agent, or Firm* — FIG. 1 Patents

(57) ABSTRACT

Embodiments of the present application are directed to a method and apparatus for SL SR and SL BSR transmission. In an embodiment of the present application, the method includes triggering a sidelink (SL) buffer status report (BSR) for an SL logical channel; triggering an SL scheduling request (SR) transmission triggered by the SL BSR for the SL logical channel; determining whether to cancel the triggered SL SR transmission; and canceling the triggered SL SR transmission in response to the triggered SL SR transmission being determined to be cancelled.

20 Claims, 15 Drawing Sheets

(51) Int. Cl.
*H04W 72/1263* (2023.01)
*H04W 80/02* (2009.01)
*H04W 92/18* (2009.01)

(56) References Cited

U.S. PATENT DOCUMENTS

| | | | | |
|---|---|---|---|---|
| 2017/0289908 | A1* | 10/2017 | Lee | H04W 52/0216 |
| 2019/0182896 | A1* | 6/2019 | Shrestha | H04L 5/00 |
| 2020/0229198 | A1* | 7/2020 | Kung | H04W 72/54 |
| 2020/0245186 | A1* | 7/2020 | Chen | H04W 88/14 |
| 2022/0183031 | A1* | 6/2022 | Zhang | H04W 72/21 |
| 2022/0210801 | A1* | 6/2022 | Xu | H04W 72/21 |

OTHER PUBLICATIONS 19936900.0, "Extended European Search Report", EP Application No. 19936900.0, Mar. 3, 2023, 11 pages.
Ericsson, "gNB-Scheduled Resource Allocation for Sidelink", 3GPP TSG-RAN WG2 #106, TDoc R2-1907354, Reno, USA [retrieved Mar. 1, 2023]. Retrieved from the Internet <https://www.3gpp.org/ftp/tsg_ran/WG2_RL2/TSGR2_106/Docs?sortby=namerev>, May 2019, 4 pages.
"International Preliminary Report on Patentability", PCT Application PCT/CN2019/095136, Jan. 20, 2022, 6 pages.
"International Search Report and Written Opinion", PCT Application PCT/CN2019/095136, Mar. 26, 2020, 8 pages.
CATT, "Consideration on Uu MAC due to V2X transmission", 3GPP TSG-RAN WG2 Meeting #103bis R2-1813730, Oct. 2018, 4 pages.
Huawei, et al., "Further discussion on SR configuration and procedure for NR SL Mode-1", 3GPP TSG-RAN WG2 # 106 R2-1907450, 05/174/2019, 9 pages.
OPPO, "Details of SR procedure", 3GPP TSG RAN WG2 #99-Bis R2-1710128, revision of R2-1707736, Oct. 2017, 5 pages.
Zte, et al., "Consideration on NR V2X mode 1 resource request", 3GPP TSG RAN WG2 Meeting #106 R2-1906483, May 17, 2019, 4 pages.

* cited by examiner

METHOD AND APPARATUS FOR SIDELINK SCHEDULING REQUEST AND BUFFER STATUS REPORT TRANSMISSION

TECHNICAL FIELD

Embodiments of the present application generally relate to wireless communication technology, especially to a method and apparatus for sidelink (SL) scheduling request (SR) and buffer status report (BSR) transmission.

BACKGROUND

In a wireless communication system, a user equipment (UE), e.g., mobile device, may communicate with another UE via a data path supported by an operator's network, e.g. a cellular or a Wi-Fi network infrastructure. The data path supported by the operator network may include a base station (BS) and multiple gateways.

In the case that both UEs are relatively close to each other, a radio link or a sidelink (SL) can be established between both UEs to provide Device-to-Device (D2D) communication and without going through a direct link to the BS. The term "SL" may refer to a direct radio link established for communicating among devices, e.g. UEs, as opposed to communicating via the cellular infrastructure (uplink and downlink) as discussed above. In this case, the "SL" is also being referred to as a D2D communication link. The D2D communication link may be used in any suitable telecommunication network in accordance with various standards, where the telecommunication network may configure a resource pool to be used by UEs during such D2D communication.

D2D communication may provide various advantages, for example, a relatively high transfer rate, a relatively low delay, etc. Moreover, during the D2D communication, traffic concentrated at a base station can be distributed. Furthermore, a UE supporting D2D communication, e.g. D2D UE, may function as a relay node to extend coverage of a base station.

D2D communication has evolved into a vehicle-to-anything (V2X) communication in the Long Term Evolution (LTE) SL standard. The V2X communication encompasses communication involving vehicles as message sources or destinations. In a New Radio (NR) communication system, unicast and groupcast communication has been introduced as part of the V2X communication standard, so as to further improve the transmission efficiency on the SL between, for example, UEs. Unicast means that data on an SL is only sent to a specific V2X UE and cannot be decoded by other UEs in Access Stratum (AS) layer. Groupcast means that data on an SL is sent to a group of V2X UEs and can be decoded in the AS layer of each receiving UE within the group.

In NR V2X standard, advanced V2X services are targeted, for example, ultra-reliable low-latency communications (URLLC) services require stringent end-to-end delay and high reliability. Accordingly, how to efficiently transmit an SL BSR for such a service is considered in a NR V2X 3rd Generation Partnership Project (3GPP) standard.

SUMMARY OF THE APPLICATION

Embodiments of the present application provide a method and apparatus for SL SR and SL BSR transmission.

An embodiment of the present application provides a method. The method may include triggering a sidelink (SL) buffer status report (BSR) for an SL logical channel; triggering an SL scheduling request (SR) transmission in response to the SL BSR triggered for the SL logical channel; determining whether to cancel the triggered SL SR transmission; and canceling the triggered SL SR transmission in response to the triggered SL SR transmission being determined to be cancelled.

In an embodiment of the present application, the method may include determining if an uplink (UL) media access control (MAC) packet data unit (PDU) is large enough to accommodate the triggered SL BSR; and cancelling the triggered SL SR transmission in response to the UL MAC PDU being large enough to accommodate the triggered SL BSR. The method may include cancelling all pending SL SR transmission(s) being triggered prior to assembling the MAC PDU.

In another embodiment of the present application, the method may include determining whether an autonomous resource selection mode is configured; and cancelling all pending SL SR transmission(s) being triggered prior to assembling a MAC PDU in response to the autonomous resource selection mode being configured. In yet another embodiment of the present application, the method may include determining whether a priority of the SL logical channel associated with the SL SR transmission is the same as or lower than a priority of an uplink (UL) logical channel associated with an UL SR transmission, and the UL SR transmission is associated with an UL BSR to be accommodated in a MAC PDU after the triggered SL SR transmission; and cancelling the triggered SL SR transmission in response to the priority of the SL logical channel is the same as or lower than the priority of the UL logical channel. In an embodiment of the present application, the method may include cancelling all pending SL SR transmission(s) and all pending UL SR transmission(s) triggered prior to assembling the MAC PDU in response to the priority of the SL logical channel is the same as or lower than the priority of the UL logical channel. In another embodiment of the present application, the method may include cancelling all pending SL SR transmission(s) and all pending UL SR transmission(s) triggered prior to assembling the MAC PDU except for the SL SR transmission triggered by the SL BSR for the SL logical channel with the priority higher than the priority of the UL logical channel associated with the UL SR transmission triggered by the UL BSR.

In yet another embodiment of the present application, the method may include determining whether a priority of the SL logical channel associated with the SL SR transmission is the same as or lower than a priority threshold in response to an UL BSR to be accommodated in an MAC PDU after the triggered SL SR transmission; and cancelling the triggered SL SR transmission in response to the priority of the SL logical channel is the same as or lower than the priority threshold. In an embodiment of the present application, the method may include cancelling all pending SL SR transmission(s) and all pending UL SR transmission(s) triggered prior to assembling the MAC PDU in response to the priority of the SL logical channel is the same as or lower than the priority threshold. In another embodiment of the present application, the method may include cancelling all pending SL SR transmission(s) and all pending UL SR transmission(s) triggered prior to assembling the MAC PDU except for the SL SR transmission triggered for the SL logical channel with the priority higher than the priority threshold.

In yet another embodiment of the present application, the method may include determining whether a highest priority of all SL logical channels associated with the SL BSR is higher than that of all UL logical channels associated with an UL BSR, and the UL BSR to be accommodated in an MAC PDU after the triggered SL SR transmission; and prioritizing the SL BSR during a logical channel prioritization (LCP) procedure for assembling the MAC PDU in response to the highest priority of the set of SL logical channels being higher than the highest priority of the set of UL logical channels.

In yet another embodiment of the present application, the method may include: in response to a size of an MAC PDU unable to accommodate the entire uplink (UL) BSR and the entire SL BSR together, prioritizing N logical channel groups (LCGs) with the highest priority in each of the entire SL BSR and the entire UL BSR during a LCP procedure for assembling the MAC PDU. In another embodiment of the present application, the method may further include: in response to a size of an MAC PDU unable to accommodate the entire uplink (UL) BSR and the entire SL BSR together, prioritizing N LCGs with the highest priority in both the entire SL BSR and the entire UL BSR during a LCP procedure for assembling the MAC PDU. N is based on UE implementation according to the size of the MAC PDU, N>=1, and each LCG includes at least one logical channels.

In yet another embodiment of the present application, the method may further include: in response to the triggered SL SR transmission and a triggered UL SR transmission to be transmitted in the same time, determining whether a priority of the SL logical channel associated with the SL SR transmission is the same as or lower than a priority of an UL logical channel associated with an UL SR, and the UL SR transmission is associated with an UL BSR to be accommodated in an MAC PDU after the triggered SL SR transmission; cancelling the SL SR transmission and transmitting the UL SR transmission in response to the priority of the SL logical channel is the same or lower than the priority of the of UL logical channel; and cancelling the UL SR transmission and transmitting the SL SR transmission in response to the priority of the SL logical channel is higher than the priority of the UL logical channel.

In yet another embodiment of the present application, the method may further include: in response to the triggered SL SR and a triggered UL SR to be transmitted at the same time, determining whether a priority of the SL logical channel associated with the SL SR transmission is the same as or lower than a priority threshold; cancelling the SL SR transmission and transmitting the UL SR transmission in response to the priority of the SL logical channel is the same or lower than the priority threshold; and cancelling the UL SR transmission and transmitting the SL SR transmission in response to the priority of the SL logical channel is higher than the priority threshold.

In yet another embodiment of the present application, the method may further include: in response to a radio link failure (RLF) being detected on a unicast sidelink, cancelling all pending SR transmission(s) associated with the unicast sidelink.

Another embodiment of the present application provides an apparatus. The apparatus may include at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions are programmed to implement the above method with the at least one receiver, the at least one transmitter and the at least one processor.

The embodiments of the present application can efficiently transmit a sidelink BSR in NR V2X based on the priority of SL LCH and whether the MAC PDU is large enough to accommodate the SL BSR and UL BSR, etc., which will facilitate and improve the implementation of NR V2X.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings.

In a NR V2X communication, V2X resource allocation mode 1 is designed to schedule a high reliability V2X service, wherein a base station (BS) is in charge of allocating SL resources for V2X communication between UEs.

In embodiments of the present application, generally, base stations may be distributed over a geographic region. In certain embodiments, a BS may also be referred to as an access terminal, an access point, a base, a Node-B, an eNB, a gNB, a Home Node-B, a relay node, or by any other terminology used in the art. A UE may include a computing device, such as a desktop computer, a laptop computer, a personal digital assistant (PDA), a tablet computer, a smart phone, a smart television (e.g., television connected to the Internet), a smart appliance (e.g., appliance connected to the Internet), a set-top box, a game console, a security system (including security camera), a vehicle on-board computer, a network device (e.g., routers, switches, modems), a wearable device, such as a smart watch, a fitness band, an optical head-mounted display, or the like. Moreover, the UE may be referred to as subscriber unit, mobile, mobile station, user, terminal, mobile terminal, fixed terminal, subscriber station, user terminal, wireless transmit/receive unit (WTRU), a device, or by other terminology used in the art.

Figure 1:
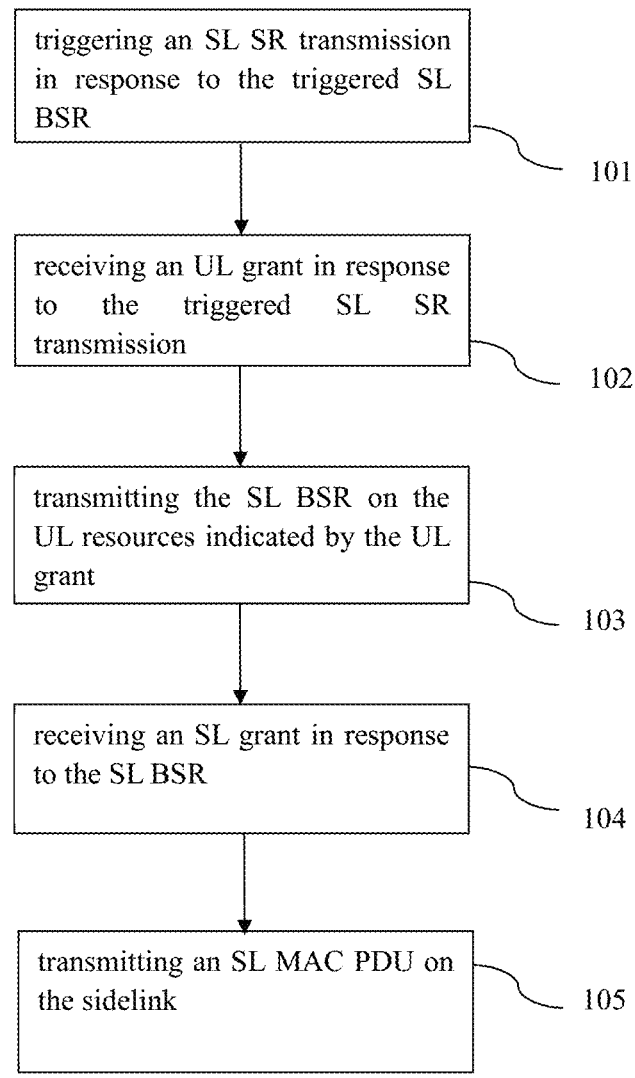
FIG. 1 is a flow diagram illustrating a method for transmitting an SL buffer status report (BSR) in NR V2X resource allocation mode 1 according to an embodiment of the present application.

FIG. 1 is a flow diagram illustrating a method for transmitting an SL buffer status report (BSR) by a UE in a NR V2X resource allocation mode 1 according to an embodiment of the present application.

In a V2X UE, arrival of data to be transmitted on a sidelink may trigger the SL BSR so that a BS can allocate necessary resources for transmitting the arrived data on the SL based on the SL BSR. To report the SL BSR to the BS, an SL scheduling request (SR) transmission associated with the SL BSR will be transmitted to the BS to request an uplink (UL) resource for the SL BSR transmission. Accordingly, as shown in FIG. 1, in step 101, the SL SR transmission can be triggered in response to the triggered SL BSR.

The UE may transmit the triggered SL SR on a physical uplink control channel (PUCCH) resource. After receiving the SL SR, the BS may transmit an UL grant, for the SL BSR transmission, to the UE. Accordingly, in step 102, the UL grant, in response to the SL SR transmitted to the BS, may be received by the UE.

In step 103, the UE may transmit the SL BSR on the UL resources indicated by the UL grant. Specially, in response to receiving the UL grant, the UE can assemble an UL media access control (MAC) packet data unit (PDU) to accommodate the SL BSR, and then transmit the UL MAC PDU to the BS.

After receiving the SL BSR from the UE, the BS can transmit an SL grant for allocating resources for data in the UE to be transmitted on the sidelink. In step 104, an SL grant in response to the SL BSR may be received by the UE.

The UE can assemble an SL MAC PDU and then transmit the SL MAC PDU on the sidelink in step 105.

However, in long term evolution (LTE) standard, the SL SR triggered by the SL BSR will be cancelled and not be transmitted when an UL BSR is accommodated in the UL MAC PDU.

Figure 2:
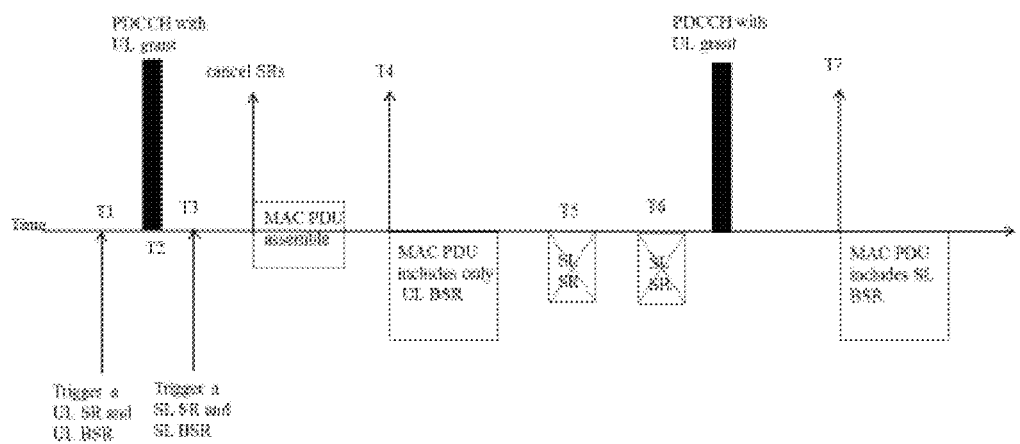
FIG. 2 is a schematic diagram illustrating a procedure for transmitting an SL BSR.

FIG. 2 is a schematic diagram illustrating a procedure for transmitting an SL BSR, wherein a triggered SL SR associated with the BSR is cancelled following the current LTE rules.

As shown in FIG. 2, at time T1, an UL BSR and an UL SR associated with the UL BSR may be triggered in a UE. The UE can transmit the UL SR to a BS to request resource for transmitting the UL BSR. At time T2, the UE receives an UL grant, in response to the transmitted UL SR, on a physical downlink control channel (PDCCH) resource from the BS. The UL grant indicates resources with a certain size (e.g. which can only accommodate the UL BSR) and time (e.g. time T4) for transmitting the UL BSR. Prior to transmitting the UL BSR as part of an UL MAC PDU at time T4, the UE will assemble the UL MAC PDU to accommodate the UL BSR based on the UL grant. However, prior to assembling the UL MAC PDU, for example at time T3, an SL BSR and an SL SR associated with the SL BSR may also be triggered in the UE, and the triggered SL BSR and SL SR are for a delay-sensitive service, for example, the URLLC service. Since the UL MAC PDU can only accommodate the UL BSR during assembling the UL MAC PDU, the SL BSR cannot be accommodated in the UL MAC PDU and all pending SRs including the triggered SL SR and the UL SR will be cancelled. Accordingly, at time T4, only the UL MAC PDU accommodating the UL BSR will be transmitted to the BS. The SL SR cannot be transmitted at time T5 and T6 to the BS, and thus the BS cannot schedule a quick UL grant for the SL BSR. The SL BSR can only be transmitted after the UE receives the next UL grant, for example, at time T7. The UE may transmit the SL BSR in an UL MAC PDU indicated by the UL grant in the case that there is no UL BSR to be transmitted at time T7.

Apparently, cancelling the triggered SL SR associated with the SL BSR will result in a quite a large delay for transmitting the SL BSR in a timely manner, which cannot satisfy the quality of service (QoS) requirements of advanced V2X services, such as an URLLC service. Thus, the SL SR cancellation mechanism and SL BSR transmission mechanism needs to be improved in NR.

Embodiments of the present application can overcome the above issue and efficiently transmit an SL BSR.

Figure 3:
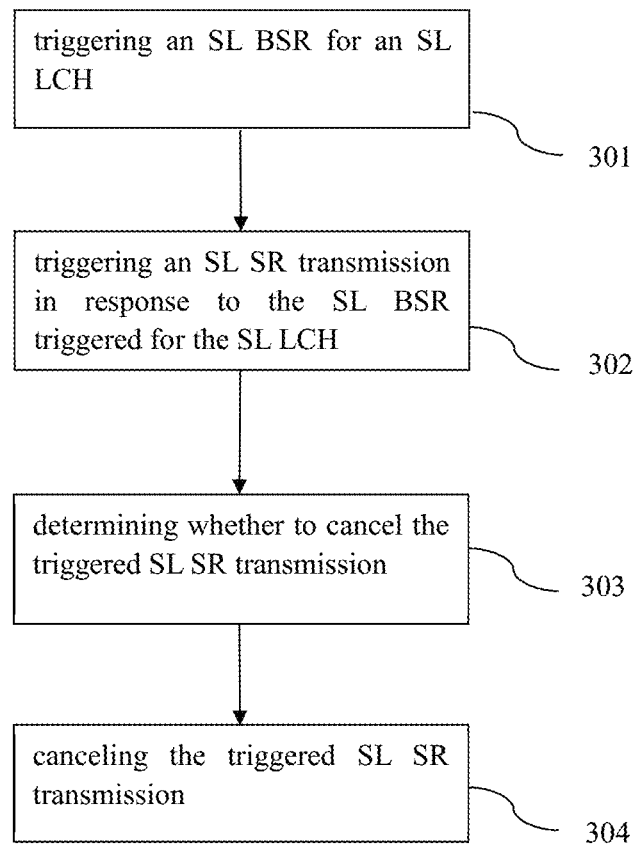
FIG. 3 is a flow diagram illustrating a method for SL SR transmission in accordance with some embodiments of the present application.

FIG. 3 is a flow diagram illustrating a method for an SL SR transmission in accordance with some embodiments of the present application. The method illustrated in FIG. 3 may be implemented by a V2X UE in NR V2X resource allocation mode 1.

Arrival of data to be transmitted on a sidelink by a V2X UE, for example, may trigger an SL BSR transmission to a BS, so that the BS can allocate resources for transmitting the data on the sidelink. The data to be transmitted on the sidelink corresponds to an SL service or an SL logical channel (LCH). A logical channel group (LCG) can include at least one LCHs, for example four LCHs. A BSR can be reported to the BS based on at least one LCG. That is, an SL BSR can be triggered for an SL LCH as shown in step 301 according to some embodiments of the present application.

To report the SL BSR to the BS, an SL SR associated with the SL BSR will be transmitted to the BS to request an UL resource for the SL BSR transmission. For example, as shown in step 302, an SL SR transmission can be triggered in response to the triggered SL BSR for the SL LCH by the V2X UE.

The UE will try to transmit the triggered SL SR transmission. However, considering current network conditions, the UE may determine whether to cancel the triggered SL SR transmission as shown in step 303. Such determination made by the UE can be based on multiple factors and strategies, for example, the priority of the SL LCH and/or whether the UL MAC PDU is large enough to accommodate an SL BSR and/or UL BSR etc., which will be specifically illustrated in combination with various embodiments in the following text.

Once the UE determines, in step 303, that the triggered SL SR transmission should be canceled, the UE will cancel the triggered SL SR transmission in step 303. Otherwise, the UE can proceed with transmitting the triggered SL SR to the BS.

Figure 4:
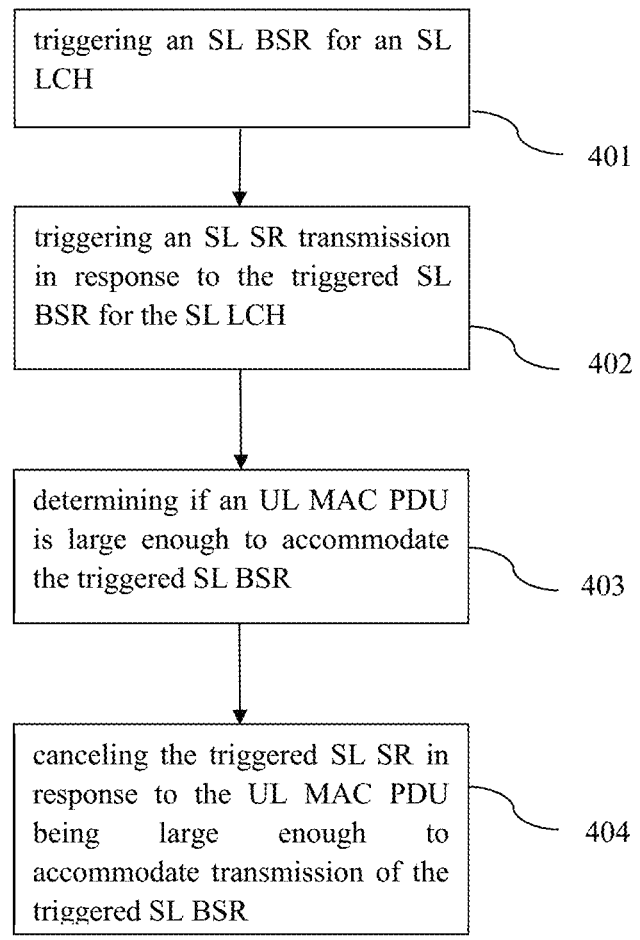
FIG. 4 is a flow diagram illustrating a method for SL SR transmission in accordance with some embodiments of the present application.

FIG. 4 is a flow diagram illustrating a method for SL SR transmission in accordance with some embodiments of the present application. The method illustrated in FIG. 4 may be implemented by a V2X UE in a NR V2X resource allocation mode 1.

The method in FIG. 4 can de-bundle an UL SR cancellation and an SL SR cancellation. That is, an SL SR can be separately cancelled.

Arrival of data to be transmitted on a sidelink, for example, in a V2X UE may trigger an SL BSR transmission to a BS so that the BS can allocate resources for transmitting the data on the SL based on the received SL BSR. That is, the SL BSR can be triggered for an SL LCH as shown in step 401 according to some embodiments of the present application.

To transmit the SL BSR to the BS, an SL SR associated with the SL BSR will be first transmitted to the BS to request allocation of an UL resource(s) for the SL BSR transmission. For example, as shown in step 402, an SL SR transmission can be triggered in response to the triggered SL BSR for the SL LCH in the V2X UE.

Prior to transmitting the triggered SL SR transmission, the UE may analyze if an UL MAC PDU is large enough to accommodate the SL BSR to determine whether to cancel the triggered SL SR as shown in step 403

In the case that the UL MAC PDU is large enough to accommodate transmission of the triggered SL BSR, the UE will cancel the triggered SL SR transmission in step 404. Otherwise, the UE can transmit the triggered SL SR to the BS. In some embodiments, the UE may cancel all pending SL SR transmission(s) being triggered prior to assembling the UL MAC PDU in response to the UL MAC PDU being large enough to accommodate the triggered SL BSR.

More specifically, all pending SL SR transmission(s) triggered prior to assembling the UL MAC PDU shall be cancelled and each respective sr-ProhibitTimer (which is described in 3GPP TS 38.321 V15.4.0) corresponding to each of all pending SL SR transmission(s) shall be stopped when the UL MAC PDU is assembled. This MAC PDU can include a Long (i.e., entire) or a Short (i.e., part) SL BSR MAC control element (CE) which contains buffer status up to (and including) the last event that triggered an SL BSR prior to assembling the MAC PDU. The BSR MAC CE is described in 3GPP TS 38.321 V15.4.0.

Figure 5:
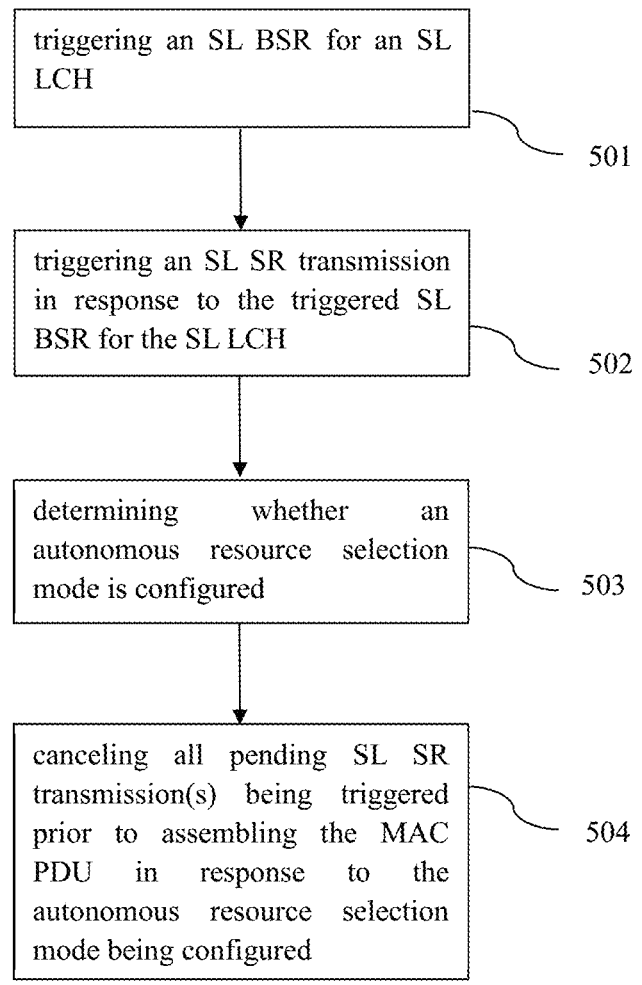
FIG. 5 is a flow diagram illustrating a method for SL SR transmission in accordance with some embodiments of the present application.

FIG. 5 is a flow diagram illustrating a method for SL SR transmission in accordance with some embodiments of the present application. The method illustrated in FIG. 5 may be implemented by a V2X UE in a NR V2X resource allocation mode 1.

The method in FIG. 5 can also de-bundle an UL SR cancellation and an SL SR cancellation. That is, an SL SR can be separately cancelled.

Arrival of data to be transmitted on a sidelink by a V2X UE, for example, may trigger an SL BSR transmission to a BS so that the BS can allocate resources for transmitting the data on the sidelink. That is, the SL BSR can be triggered for an SL LCH as shown in step 501 according to some embodiments of the present application.

To report the SL BSR to the BS, an SL SR associated with the SL BSR will be transmitted to the BS to request an UL resource for the SL BSR transmission. For example, as shown in step 502, the SL SR transmission can be triggered in response to the triggered SL BSR for the SL LCH in the V2X UE.

The UE will try to transmit the triggered SL SR transmission. However, prior to transmission, the UE will determine whether an autonomous resource selection mode is configured to determine whether to cancel the triggered SL SR as shown in step 503.

In the case that the autonomous resource selection mode is configured, the UE will cancel all pending SL SR transmission(s) being triggered prior to assembling the MAC PDU. For example, the autonomous resource selection mode may be configured by a layer higher than a MAC layer, such as radio resource control (RRC) layer. Otherwise, the UE can transmit the triggered SL SR transmission to the BS.

Figure 6:
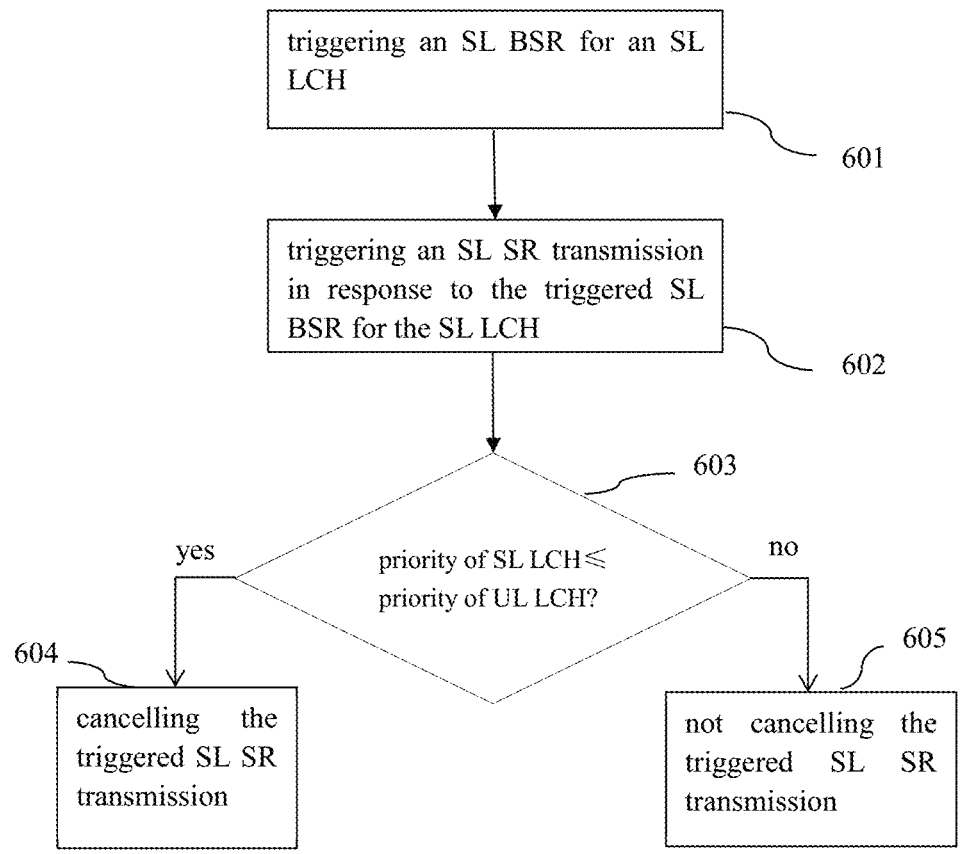
FIG. 6 is a flow diagram illustrating a method for SL SR transmission in accordance with some embodiments of the present application.

FIG. 6 is a flow diagram illustrating a method for SL SR transmission in accordance with some embodiments of the present application. The method illustrated in FIG. 6 may be implemented by a V2X UE in a NR V2X resource allocation mode 1.

The method in FIG. 6 can partially de-bundle an UL cancellation and an SL SR cancellation. That is, some special conditions are designed for the SL SR cancellation to maximally reuse an LTE SR cancellation mechanism for the NR V2X UE.

Arrival of data to be transmitted on a sidelink by a V2X UE, for example, may trigger an SL BSR transmission to a BS, so that the BS can allocate resources for transmitting the data on the sidelink. That is, the SL BSR can be triggered for an SL LCH as shown in step 601 according to some embodiments of the present application.

To report the SL BSR to the BS, an SL SR associated with the SL BSR will be transmitted to the BS to request an UL resource for the SL BSR transmission. For example, as shown in step 602, an SL SR transmission can be triggered in response to the triggered SL BSR for the SL LCH by the V2X UE.

The UE will try to transmit the triggered SL SR transmission to the BS, however, prior to transmission, the UE will determine whether a MAC PDU can accommodate an UL BSR and whether a priority of an SL LCH associated with the SL SR transmission is the same as or lower than a priority of the UL LCH associated with the UL SR transmission to determine whether to cancel the triggered SL SR transmission as shown in step 603. The SL LCH associated with the SL SR transmission can be the SL LCH that triggers the SL SR transmission, and the UL LCH associated with the UL SR transmission can be the UL LCH that triggers the UL SR transmission. The SL SR transmission here refers to an SR transmission which is triggered by an SL BSR for an SL LCH, and the UL SR transmission here refers to an SR transmission which is triggered by an UL BSR for an UL LCH.

Specifically, when assembling the MAC PDU, if the MAC PDU is large enough to accommodate the triggered UL BSR and not the SL BSR; the priority of the SL LCH or the SL service associated with the SL SR transmission will be compared with the priority of the UL LCH associated with the UL SR transmission.

In the case that the priority of the SL LCH or the SL service associated with the SL SR is the same as or lower than priority of the UL LCH, for example, the UL service is an enhanced Mobile Broadband (eMBB) service and the SL service is also an eMBB service, or the UL service is an URLLC service and the SL service is an eMBB service, the UE will cancel the triggered SL SR transmission in step 604 of FIG. 6. In some embodiments, the UE may cancel all pending SL SR transmission(s) and all pending UL SR transmission(s) being triggered prior to assembling the MAC PDU, once the UE determines that the priority of the SL LCH or the SL service associated with the SL SR transmissions is the same as or lower than priority of the UL LCH.

More specifically, all pending SL SR transmission(s) and all pending UL SR transmission(s) being triggered by both the SL BSR and the UL BSR shall be cancelled and sr-ProhibitTimer shall be stopped when the MAC PDU is assembled to include the UL BSR which contains buffer status up to (and including) the last event that triggered an UL BSR, if the priority of the SL LCH or the SL service associated with the SL SR transmission and SL BSR transmission is the same as or lower than priority of the UL LCH.

In another embodiment, after triggering transmission of the SL BSR and the SL SR for the SL LCH and the UE determines that the UL BSR is to be accommodated in the MAC PDU, the UE may determine whether the priority of the SL LCH associated with the SL SR transmission is the same as or lower than a priority threshold. In the case that the priority of the SL LCH is the same as or lower than the priority threshold, the UE will cancel the triggered SL SR transmission. The priority threshold can be configured by an upper layer, gNB or preconfigured.

More specifically, all pending SL SR transmission(s) and all pending UL SR transmission(s) being triggered by both UL BSR and SL BSR prior to assembling the MAC PDU shall be cancelled and sr-ProhibitTimer shall be stopped when the MAC PDU is assembled and this PDU includes the UL BSR which contains buffer status up to (and including) the last event that triggered an UL BSR, if the priority of the SL LCH or the SL service triggering the SL SR transmission and SL BSR is the same as or lower than the priority threshold.

In the case that the priority of the SL LCH or the SL service associated with the SL SR transmission is higher than the priority of the UL LCH (N in FIG. 6), the UE will not cancel all pending SL SR(s) transmissions at step 605.

More specifically, all pending UL SR transmission(s) triggered by the UL BSR shall be cancelled and sr-ProhibitTimer shall be stopped when the MAC PDU is assembled to contain the UL BSR that contains buffer status up to (and including) the last event that triggered the UL BSR, if the priority of SL LCH that triggers SL BSR which further triggers SL SR transmission is higher than the priority of UL LCH associated with the UL SR transmission. That is, all pending SL SR transmission(s) are not cancelled.

Figure 7:
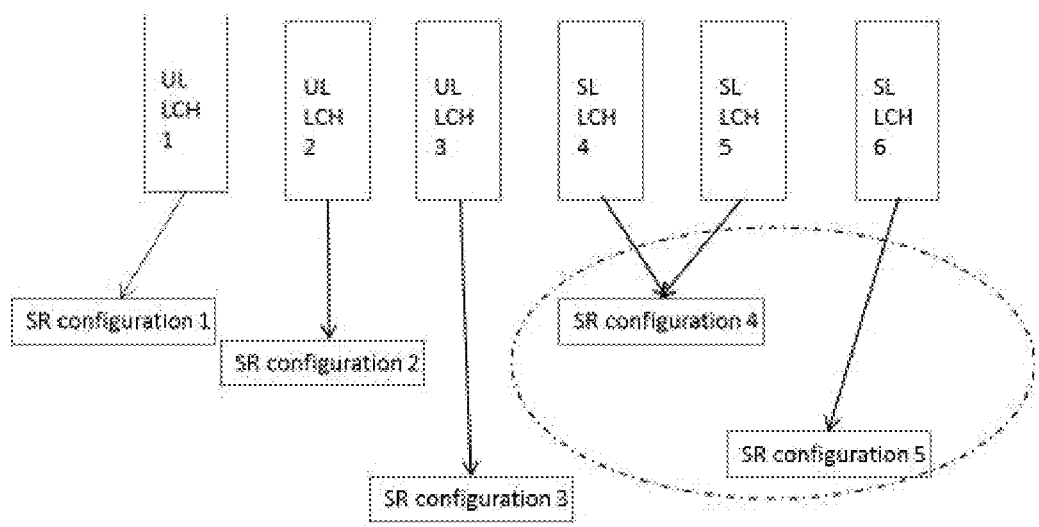
FIG. 7 illustrates an example of SL SRs and UL SRs to be handled by the method shown in FIG. 6 according to some embodiments of the present application.

FIG. 7 illustrates an example of SL SRs and UL SRs to be handled by the method shown in FIG. 6 according to some embodiments of the present application.

As shown in FIG. 7, there are six logical channels (LCHs), that is, LCH 1, LCH 2, LCH 3, LCH 4, LCH 5 and LCH 6. LCH 1, LCH 2 and LCH 3 are mapped to UL services, and are shown as UL LCH 1, UL LCH2, and UL LCH3 in FIG. 7, respectively. LCH 4, LCH 5 and LCH 6 are mapped to SL services, and are shown as SL LCH 4, SL LCH 5, and SL LCH 6 in FIG. 7, respectively. In addition, as shown in FIG. 7, the UL LCH 1 is mapped to SR configuration 1, the UL LCH 2 is mapped to SR configuration 2, the UL LCH 3 is mapped to SR configuration 3, both the SL LCH 4 and the SL LCH 5 are mapped to SR configuration 4, and the SL LCH 6 is mapped to SR configuration 5. Each SR configuration represents an SR. SR configuration is the configuration of SR physical layer resource that associated with a SR. And In SR configuration, the mapping between LCHs and SR are also configured. It is assumed that the UL LCH 1, the UL LCH 2, and the UL LCH 3 are assigned for an eMBB service with a lower priority, the SL LCH 4 and the SL LCH 5 are used for URLLC service with a higher priority, and the SL LCH 6 is used for an eMBB service with a lower priority. In this case, a UE will not cancel all pending SL SR(s) (including SR configuration 4 and SR configuration 5) (in dashed circle).

In another embodiment, in the case that the priority of the SL LCH or the SL service associated with the SL SR transmission is higher than that of the UL LCH, the UE will not cancel the SL SR transmission with the higher priority.

Specifically, all pending SL SR transmission(s) and all pending UL SR transmission(s) triggered prior to assembling the MAC PDU are cancelled except for the SL SR transmission(s), which respectively associated with the SL LCH(s) with the priority higher than the priority of the UL LCH associated with the UL BSR and the UL SR transmission.

More specifically, all pending SR transmission(s) including both UL SR transmissions and SL SR transmission that triggered by both the UL BSR and the SL BSR, respectively, shall be cancelled and sr-ProhibitTimer shall be stopped when the MAC PDU is being assembled to include an UL BSR that contains buffer status up to (and including) the last event that triggered the UL BSR, except for those SL SR transmission(s) for which the priority(s) of the SL LCH(s) is higher than the priority(s) of the UL LCH(s).

Figure 8:
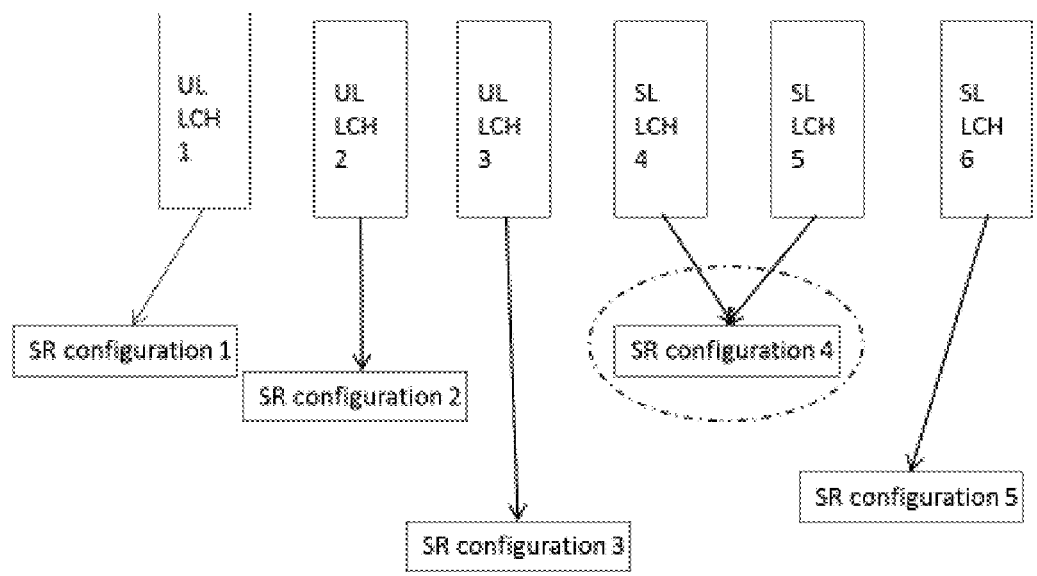
FIG. 8 illustrates another example of SL SRs and UL SRs to be handled by the method shown in FIG. 6 according to some embodiments of the present application.

FIG. 8 illustrates another example of SL SRs and UL SRs to be handled by the method shown in FIG. 6 according to some embodiments of the present application. The SR configurations in FIG. 8 are the same as those shown in FIG. 7. It is also assumed that UL LCH 1, UL LCH 2 and UL LCH 3 are used for an eMBB service with a lower priority, SL LCH 4 and SL LCH 5 are used for URLLC service with a higher priority, and SL LCH 6 is used for an eMBB service with a lower priority. Different from the embodiment shown in FIG. 7, the SL SR (i.e., SR configuration 4) triggered for transmission for the SL LCH 4 and the SL LCH 5 will not be cancelled in FIG. 8, and UL SR(s) triggered for the UL LCH 1, the UL LCH 2, and the UL LCH 3 and SL SR triggered for the SL LCH 6 are cancelled, because the priority of SL LCH 4 and SL LCH 5 is higher than that of UL LCH 1, UL LCH 2, UL LCH 3, and SL LCH 6.

In another embodiment, after triggering the SL BSR and the SLR SR for the SL LCH, in the case that the UL BSR is also to be accommodated in the MAC PDU, the UE may determine whether the priority of the SL LCH associated with the SL SR is higher than a priority threshold. In the case that the UE determines that the priority of the SL LCH associated with the SL SR is higher than a priority threshold, the UE will cancel all pending UL SR transmission(s), but not cancel the pending SL SR transmission(s).

More specifically, all pending UL SR transmission(s) that triggered by UL BSR shall be cancelled and sr-ProhibitTimer shall be stopped when the MAC PDU is assembled to include the UL BSR which contains buffer status up to (and including) the last event that triggered the UL BSR, if the priority of SL LCH that triggers SL SR transmission and the SL BSR is higher than the priority threshold. All pending SL SR transmission(s) are not cancelled.

In another embodiment, in the case that the priority of the SL LCH or the SL service associated with the SL SR transmission is higher than the priority threshold, the UE will not cancel the SL SR.

Specifically, all pending SL SR transmission(s) and all pending UL SR transmission(s) triggered prior to assembling the MAC PDU are cancelled except for the SL SR transmission(s), which respectively triggered by the SL LCH(s) with the priority(s) higher than the priority threshold.

More specifically, all pending SR(s) including both UL SR transmission and SL SR transmission that triggered by both UL BSR and SL BSR, respectively, shall be cancelled and sr-ProhibitTimer shall be stopped when the MAC PDU is assembled to include an UL BSR which contains buffer status up to (and including) the last event that triggered an UL BSR, except for those SL SR transmissions for which the priority(s) of the SL LCH(s) that trigger the SL SR transmission and the SL BSR is higher than the priority threshold.

Figure 9:
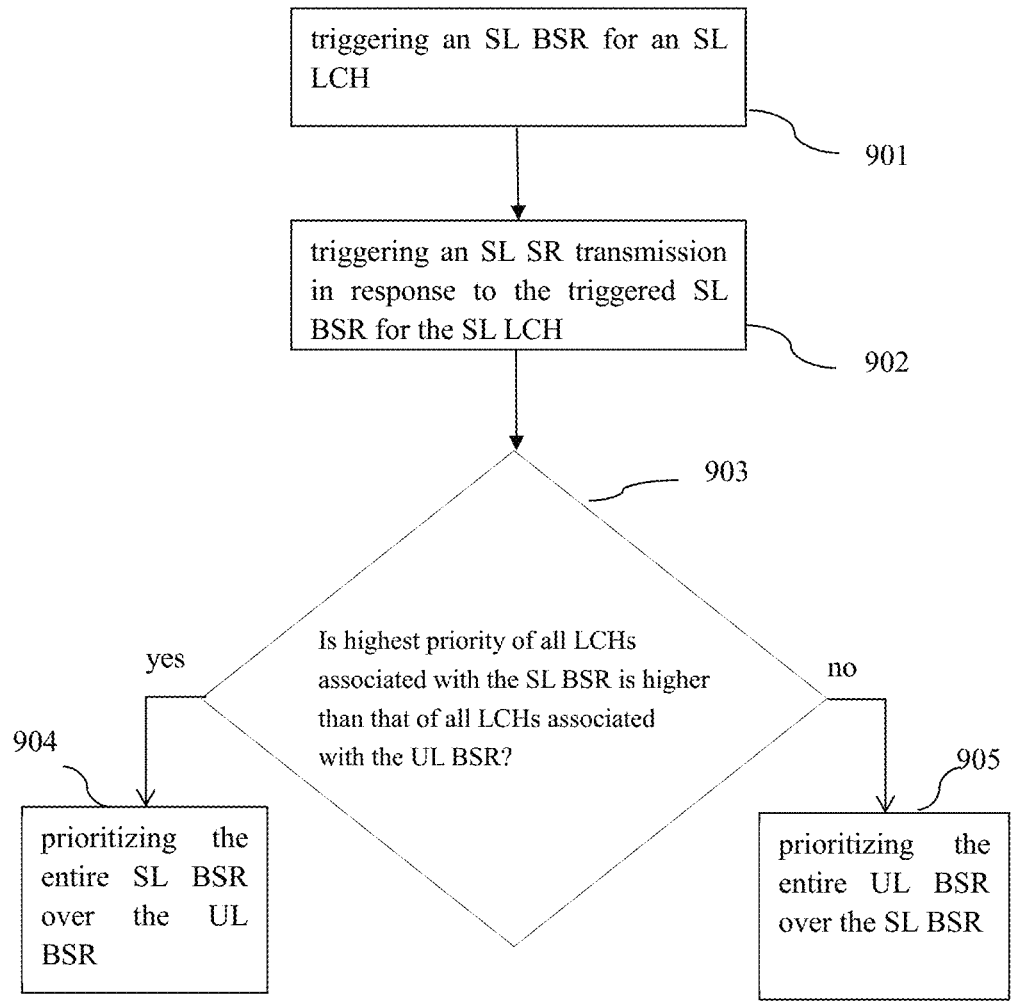
FIG. 9 is a flow diagram illustrating a method for SL BSR transmission in accordance with some embodiments of the present application.

FIG. 9 is a flow diagram illustrating a method for SL BSR transmission in accordance with some embodiments of the present application. The method illustrated in FIG. 9 can be implemented by a V2X UE in a NR V2X resource allocation mode 1.

As shown in step 901, the SL BSR can be triggered for an SL LCH. In step 902, an SL SR transmission can be triggered in response to the triggered SL BSR for the SL LCH. Before transmitting the SL SR, an UL grant may be received, which indicates a MAC PDU for uplink transmission, e.g. a triggered UL BSR. According to some embodiments of the present application, although the MAC PDU is not scheduled for the SL BSR, whether the MAC PDU is large enough to accommodate the SL BSR can be determined based on the priority of the SL BSR and that of the UL BSR.

Specifically, a logical channel prioritization (LCP) procedure can be performed at the beginning of assembling the MAC PDU so that LCHs will be included in the MAC PDU in order of priority. An LCH with the highest priority can be first included in the MAC PDU. Whether an LCH with low priority can be included in the MAC PDU dependent on the size of the MAC PDU. That is, the method illustrated in FIG. 9 can dynamically compare the priority of a triggered SL BSR with that of an UL BSR to be transmitted during the LCP procedure. For example, in step 903, the UE determines whether the highest priority of all LCHs associated with the SL BSR is higher than that of all LCHs associated with the UL BSR.

In the case that the highest priority of all LCHs associated with the SL BSR is higher than that of all LCHs associated with the UL BSR, the entire SL BSR will be prioritized over the entire UL BSR during an LCP procedure in step 904. That is, the entire SL BSR can be assembled first into the MAC PDU. Whether the entire UL BSR can be included as well in the MAC PDU depends on the size of the MAC PDU. Accordingly, the triggered SL SR transmission can be cancelled due to the entire SL BSR being included in a scheduled MAC PDU. Otherwise, in the case the highest priority of all LCHs associated with the SL BSR is equal to or lower than that of all LCHs associated with the UL BSR, the entire UL BSR will be prioritized the SL BSR during a LCP procedure in step 905.

Figure 10:
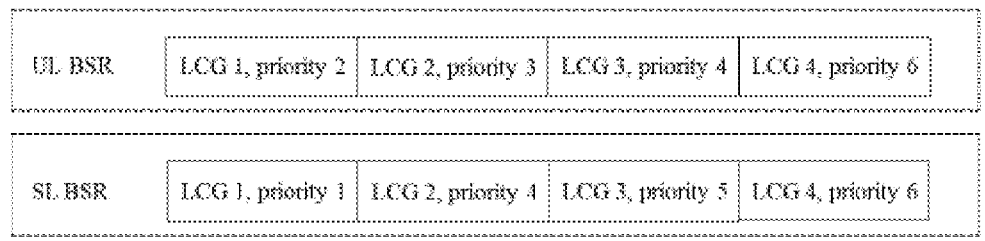
FIG. 10 illustrates an example of an SL BSR and an UL BSR to be handled by the method shown in FIG. 9 according to some embodiments of the present application.

FIG. 10 illustrates an example of an SL BSR and an UL BSR to be handled by the method shown in FIG. 9 according to some embodiments of the present application.

As shown in FIG. 10, an UL BSR contains four LCGs, i.e. LCG 1, LCG 2, LCG 3, and LCG 4; and an SL BSR also contains four LCGs, i.e. LCG 1, LCG 2, LCG 3, and LCG 4; wherein each LCG contains a set of LCHs. It is assumed that in the UL BSR, the highest priority of the LCHs in LCG 1 is 2, the highest priority of the LCHs in LCG 2 is 3, the highest priority of the LCHs in LCG 3 is 4, and the highest priority of the LCHs in LCG 4 is 6. Thus, the highest priority of all the LCHs in the UL BSR is 2. It is assumed that in SL BSR, the highest priority of the LCHs in LCG 1 is 1, the highest priority of the LCHs in LCG 2 is 4, the highest priority of the LCHs in LCG 3 is 5, and the highest priority of the LCHs in LCG 4 is 6. Thus, the highest priority of all the LCHs in the SL BSR is 1. Therefore, the UE may determine that the highest priority of all LCHs in the SL BSR is higher than that of all LCHs in the UL BSR. Accordingly, the SL BSR will be prioritized over the UL BSR during the LCP procedure.

Figure 11:
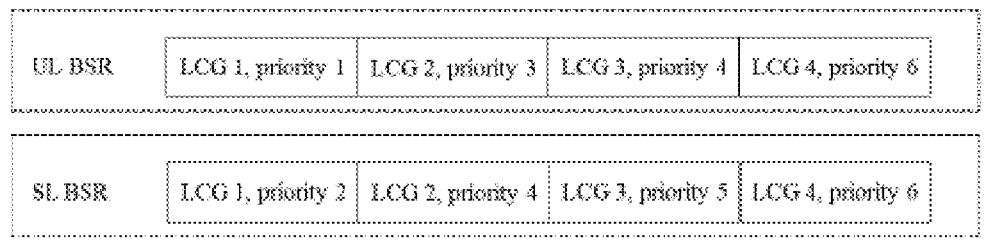
FIG. 11 illustrates another example of an SL BSR and an UL BSR to be handled by the method shown in FIG. 9 according to some embodiments of the present application.

FIG. 11 illustrates another example of an SL BSR and an UL BSR to be handled by the method shown in FIG. 9 according to some embodiments of the present application.

As shown in FIG. 11, an UL BSR contains four LCGs, i.e. LCG 1, LCG 2, LCG 3, and LCG 4; and an SL BSR also contains four LCGs, i.e. LCG 1, LCG 2, LCG 3, and LCG 4; wherein each LCG contains a set of LCHs. It is assumed that in the UL BSR, the highest priority of the LCHs in LCG 1 is 1, the highest priority of the LCHs in LCG 2 is 3, the highest priority of the LCHs in LCG 3 is 4, and the highest priority of the LCHs in LCG 4 is 6. Thus, the highest priority of all the LCHs in the UL BSR is 1. It is also assumed that in SL BSR, the highest priority of the LCHs in LCG 1 is 2, the highest priority of the LCHs in LCG 2 is 4, the highest priority of the LCHs in LCG 3 is 5, and the highest priority of the LCHs in LCG 4 is 6. Thus, the highest priority of all the LCHs in the SL BSR is 2. Therefore, the UE may determine that the highest priority of all LCHs in the UL BSR is higher than that of all LCHs in the SL BSR. Accordingly, the UL BSR will be prioritized over the SL BSR during the LCP procedure.

In some other embodiments of the present application, the UE may prioritize the SL BSR and the UL SR based on a LCG during a LCP procedure for assembling the MAC PDU, i.e. partly prioritizing a BSR (SL BSR or UL BSR) rather than prioritizing the BSR in its entirety, especially in the case that the size of the MAC PDU cannot accommodate an entire UL BSR or an entire SL BSR. The sequence of assembling an LCG, which may be an LCG of an UL BSR or an LCG of an SL BSR, into the MAC PDU can be determined by the highest priority of all LCHs associated with the LCG.

Figure 12:
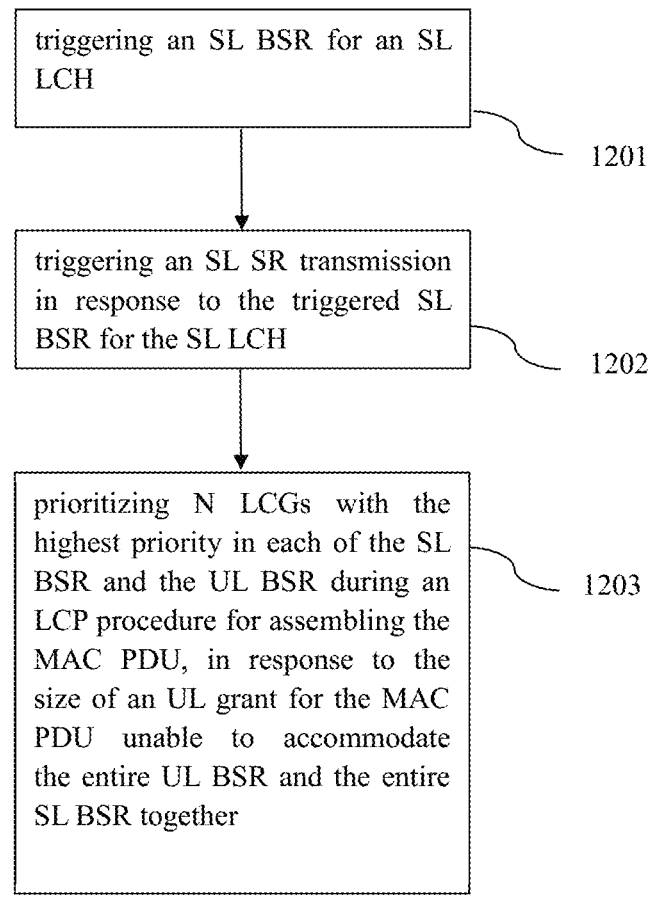
FIG. 12 is a flow diagram illustrating a method for SL BSR transmission in accordance with some embodiments of the present application.

FIG. 12 is a flow diagram illustrating a method for SL BSR transmission in accordance with some embodiments of the present application. The method illustrated in FIG. 12 can be implemented by a V2X UE in a NR V2X resource allocation mode 1.

As shown in step 1201, an SL BSR can be triggered for an SL LCH. In step 1202, an SL SR transmission can be triggered in response to the triggered SL BSR for the SL LCH. Before transmitting the SL SR, an UL grant may be received, which indicates a MAC PDU for uplink transmission of, e.g. a triggered UL BSR. According to some embodiments of the present application, although the MAC PDU is not scheduled for the SL BSR, whether the SL BSR can be accommodated in the MAC PDU can be determined based on the priority of the SL BSR and that of the UL BSR.

Specifically, an LCP procedure can be performed at the beginning of assembling the MAC PDU so that LCHs will be included in the MAC PDU in order of priority. An LCH with the highest priority can be first included in the MAC PDU. Whether an LCH with low priority can be also included in the MAC PDU dependent on the size of the MAC PDU. That is, the method illustrated in FIG. 12 can dynamically compare the priority of a triggered SL BSR with that of an UL BSR to be transmitted during the LCP procedure and part of the SL BSR will be prioritized during an LCP procedure and truncated SL BSR will be transmitted.

Specifically, part of the UL BSR and the SL BSR are added into the MAC PDU during the LCP procedure, i.e. truncated UL BSR MAC control element (CE) format and truncated SL BSR MAC CE format need to be used.

In step 1203, in the case that a size of an UL grant for the MAC PDU unable to accommodate the entire UL BSR and the entire SL BSR together, N LCGs with the highest priority in each will be prioritized during the LCP procedure for assembling the MAC PDU. That is, the N LCGs with the highest priority in each BSR can be first added to the MAC PDU. Whether the remaining LCGs with lower priority can be added as well to the MAC PDU dependent on the size of the MAC PDU.

The number of N LCGs with the highest priority is based on UE implementation according to the size of the UL grant with N>=1. That is to say, the size of the UL grant is larger than the target truncated UL BSR MAC CE plus its sub-header and target truncated SL BSR MAC CE plus its sub-header. For example, if the size of the UL grant is larger than the size of two LCGs but less than three LCGs, then only two LCGs, one from each BSR, i.e. UL BSR and SL BSR, can be included in the MAC PDU.

For example, as shown in FIG. 11, in the UL BSR, the highest priority of the LCHs in LCG 1 is 1, the highest priority of the LCHs in LCG 2 is 3, the highest priority of the LCHs in the LCG 3 is 4, and the highest priority of the LCHs in LCG 4 is 6; and in SL BSR, the highest priority of the LCHs in LCG 1 is 2, the highest priority of the LCHs in LCG 2 is 4, the highest priority of the LCHs in LCG 3 is 5, and the highest priority of the LCHs in LCG 4 is 6. If N=1, then LCG 1 in the UL BSR with priority of 1 (the first highest priority of LCGs in the UL BSR) and LCG 1 in the SL BSR with the priority of 2 (the first highest priority of LCGs in the SL BSR) will be prioritized during the LCP procedure and assembled in the MAC PDU.

Figure 13:
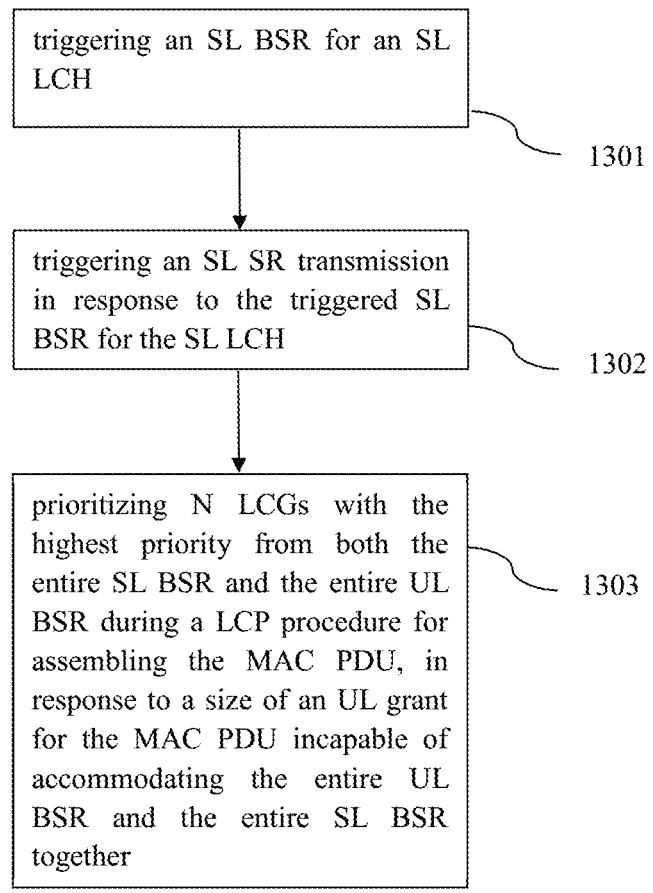
FIG. 13 is a flow diagram illustrating a method for SL BSR transmission in accordance with some embodiments of the present application.

FIG. 13 is a flow diagram illustrating a method for SL BSR transmission in accordance with some embodiments of the present application. The method illustrated in FIG. 13 can be implemented by a V2X UE in a NR V2X resource allocation mode 1.

As shown in step 1301, an SL BSR can be triggered for an SL LCH. In step 1302, an SL SR transmission can be triggered in response to the triggered SL BSR for the SL LCH. Before transmitting the SL SR, an UL grant may be received, which indicates a MAC PDU for an uplink transmission, for example, a triggered UL BSR transmission. According to some embodiments of the present application, although the MAC PDU is not scheduled for the SL BSR transmission, whether the SL BSR can be accommodated in the MAC PDU can be determined based on the priority of the SL BSR and that of the UL BSR.

Specifically, an LCP procedure can be performed prior to assembling a MAC PDU so that LCHs will be included in the MAC PDU in the order of priority, for example, by including an LCH with the highest priority first. Whether an LCH with a lower priority can be added to the MAC PDU depends on the size of the MAC PDU. That is, the method illustrated in FIG. 13 can dynamically compare the priority of a triggered SL BSR with that of an UL BSR during the LCP procedure, and part of the SL BSR will be prioritized during the LCP procedure with truncated BSR being transmitted.

Specifically, part of an UL BSR and an SL BSR are added into a MAC PDU during an LCP procedure, i.e. truncated UL BSR MAC CE format and truncated SL BSR MAC CE format need to be used.

In step 1303, in the case that the size of an UL grant for the MAC PDU unable to support inclusion of the entire UL BSR and of the entire SL BSR together, N LCGs with the highest priority in both BSRs, i.e. the entire SL BSR and the entire UL BSR, will be prioritized during an LCP procedure for assembling the MAC PDU. That is, the N LCGs with the highest priority in both can be first added into the MAC PDU. Whether the remaining LCGs with lower priority can be assembled in the MAC PDU dependent on the size of the MAC PDU. The number of N is based on UE's implementation according to the size of the UL grant, with N>=1.

For example, if N=3, the first 3 highest priority LCGs from both the UL BSR and the SL BSR, for example, that is, LCG1 in UL BSR with priority 1, LCG 1 in SL BSR with priority 2, and LCG 2 in UL BSR with priority 3, as shown in FIG. 11 will be prioritized during the LCP procedure and assembled as part of the MAC PDU.

Figure 14:
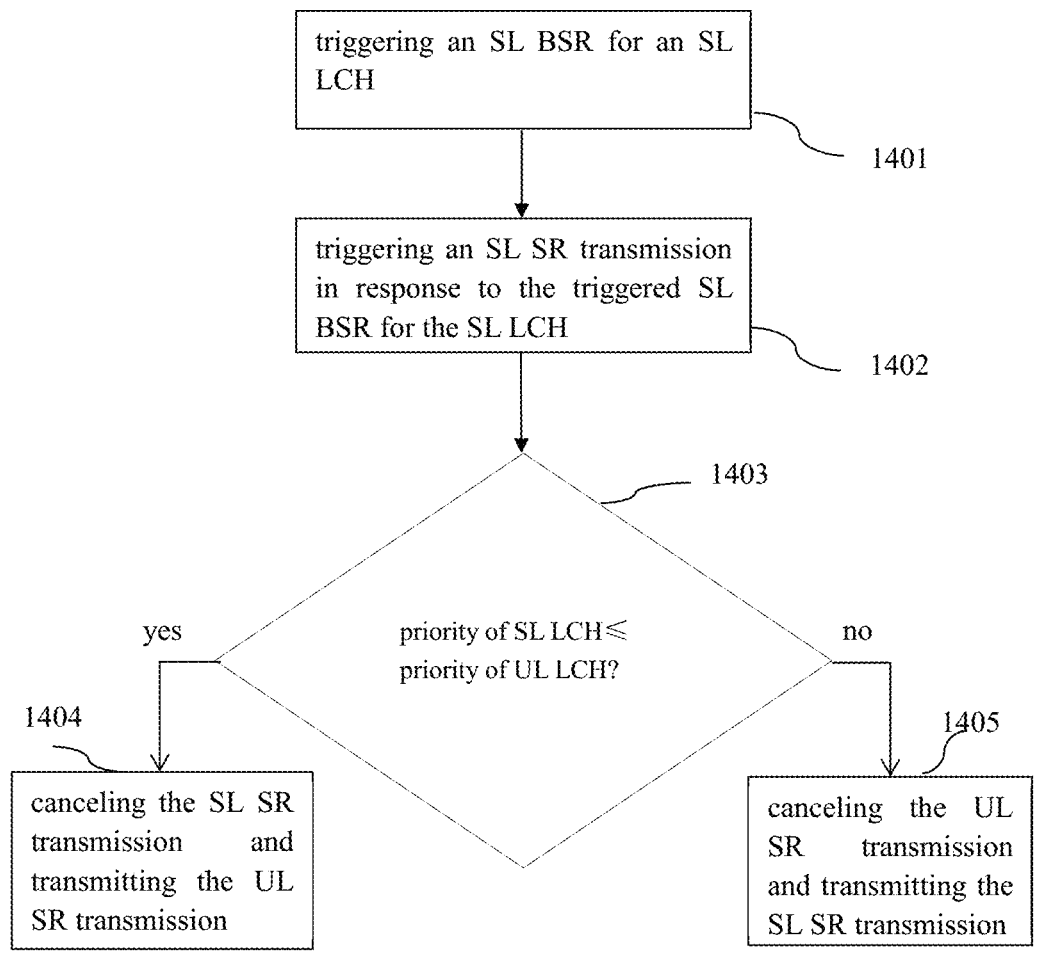
FIG. 14 is a flow diagram illustrating a method for SL BSR transmission in accordance with some embodiments of the present application.

FIG. 14 is a flow diagram illustrating a method for SL SR transmission in accordance with some embodiments of the present application. The method illustrated in FIG. 14 may be implemented by a V2X UE in a NR V2X resource allocation mode 1.

According to some embodiments of the present application, separated SR resources and configurations can be supported for an UL and an SL in a NR V2X resource allocation mode 1. Accordingly, in the case that the SL SR and the UL SR will be transmitted at the same time, there could be collision (i.e., PUCCH resource overlapping in a transmission time interval (TTI)) between the UL SR and the SL SR.

Similarly, in step 1401, an SL BSR can be triggered for an SL LCH. In step 1402, an SL SR transmission can be triggered in response to the triggered SL BSR for the SL LCH. However, it is found that the triggered SL SR is to be transmitted in the same time as a triggered UL SR transmission. That is, the transmission of the SL SR collides with that of the UL SR. The UE has to choose only one SR to transmit at a given time. According to some embodiments of the present application, in step 1403, in response to both the SL SR and the UL SR to be triggered to transmit at the same time, the UE can determine whether a priority of the SL LCH associated with the SL SR transmission is the same as or lower than that of an UL LCH associated with the UL SR transmission. The UE will transmit the SR transmission associated with a higher priority LCH.

Accordingly, in response to the priority of the SL LCH being the same or lower than the priority of the UL LCH, the UE may cancel transmission of the SL SR and transmit the UL SR in step 1404 instead. While, in response to the priority of the SL LCH being higher than the priority of the UL LCH, the UE may cancel the UL SR transmission and transmit the SL SR in step 1405 instead.

Figure 15:
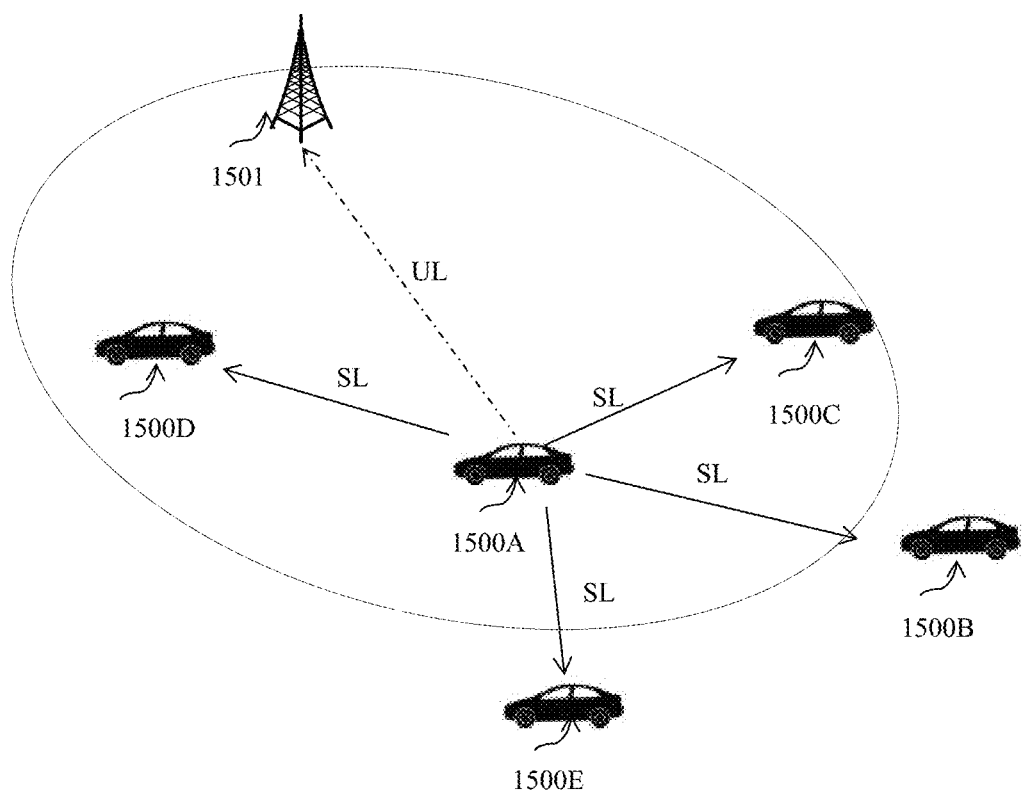
FIG. 15 is a schematic diagram illustrating a V2X scenario according to some embodiments of the present application.

In some embodiments of the present application, the sidelink in which an SL BSR is to be transmitted may be a unicast sidelink. FIG. 15 is a schematic diagram illustrating a V2X scenario according to some embodiments of the present application.

FIG. 15 depicts a BS 1501 and a plurality of UEs 1500A-1500E in the exemplary V2X scenario, wherein the BS 1501 is in charge of allocating SL resources for V2X transmissions between UEs 1500A-1500E. All the sidelinks between the UE 1500A and other UEs, such as 1500B, 1500C, 1500D and 1500E are unicast sidelinks.

In the case when the UE 1500A is a transmitting (Tx) UE, it can transmit an SR to the BS 1501 requesting resources for an SL BSR to be transmitted in a unicast sidelink. In the case a radio link failure (RLF) has been detected on the unicast sidelink, the Tx UE 1500A may cancel all pending SR(s) associated with the unicast sidelink. For example, if a RLF being detected on the unicast sidelink between the Tx UE 1500A and the UE 1500B, the Tx UE 1500A can only cancel pending SL SR(s) related to the unicast sidelink between the Tx UE 1500A and the UE 1500B. Accordingly, a pending SL BSR(s) cannot be transmitted. For other unicast sidelink without a RLF, for example, a sidelink between Tx UE 1500A and UE 1500C, the Tx UE 1500A will not cancel pending SL SR transmission(s).

Figure 16:
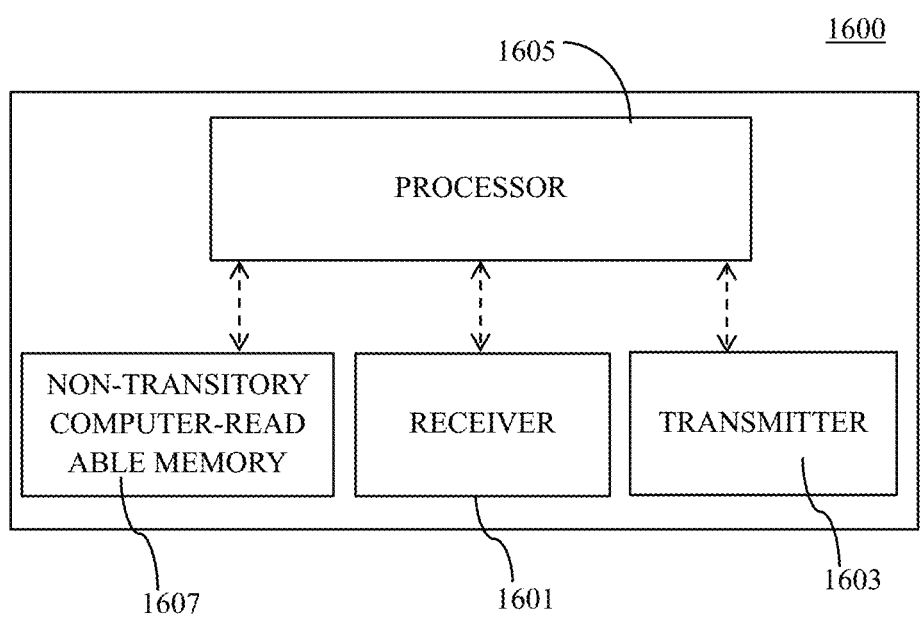
FIG. 16 illustrates an apparatus for SL SR and BSR transmission in accordance with some embodiments of the present application.

FIG. 16 illustrates an apparatus for SL SR and BSR transmission in accordance with some embodiments of the present application.

As shown in FIG. 16, the apparatus 1600 may include a receiver 1601, a transmitter 1603, a processor 1605, and a non-transitory computer-readable medium 1607. The non-transitory computer-readable medium 1607 has computer executable instructions stored therein. The processor 1605 is configured to be coupled to the non-transitory computer readable medium 1607, the receiver 1601, and the transmitter 1603. It is contemplated that the apparatus 1600 may include more computer-readable mediums, receiver, transmitter and processors in some other embodiments of the present application according to practical requirements. In some embodiments, the apparatus 1600 may be a V2X UE. The V2X UE may include, for example but is not limited to, a computing device, a wearable device, a mobile device, an Internet of Things (IoT) device, a vehicle having at least a transceiver, etc. In some embodiments of the present application, the receiver 1601 and the transmitter 1603 are integrated into a single device, such as a transceiver. In certain embodiments, the apparatus 1600 may further include an input device, a memory, and/or other components.

In some embodiments of the present application, the non-transitory computer-readable medium 1607 may have stored thereon computer-executable instructions to cause a processor to implement the method according to embodiments of the present application.

In some embodiments of the present application, the apparatus may be a vehicle. Persons skilled in the art should understand that as the technology develops and advances, the terminologies described in the present application may change, and should not affect or limit the principle and spirit of the present application.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A user equipment (UE) for wireless communication, comprising:
   at least one memory; and
   at least one processor coupled with the at least one memory and configured to cause the UE to:
   trigger a sidelink buffer status report for a sidelink logical channel;
   trigger a sidelink scheduling request transmission in response to the sidelink buffer status report triggered for the sidelink logical channel;
   determine, prior to transmitting the sidelink scheduling request transmission, that a size of an uplink media access control packet data unit is large enough to accommodate the sidelink buffer status report;
   cancel, independent of an uplink scheduling request transmission associated with the uplink media access control packet data unit, the sidelink scheduling request transmission in response to determining that the size of the uplink media access control packet data unit is large enough to accommodate the sidelink buffer status report; and
   transmit the uplink media access control packet data unit, wherein the uplink media access control packet data unit comprises the sidelink buffer status report.

2. The UE of claim 1, wherein the at least one processor to is configured to cause the UE to:
   cancel one or more pending sidelink scheduling request transmissions being triggered prior to assembling the uplink media access control packet data unit.

3. The UE of claim 1, wherein the at least one processor is configured to cause the UE to:
   determine whether an autonomous resource selection mode is configured; and
   cancel one or more pending sidelink scheduling request transmissions being triggered prior to assembling a media access control packet data unit in response to the autonomous resource selection mode being configured.

4. The UE of claim 1, wherein the at least one processor is configured to cause the UE to:
   determine whether a priority of the sidelink logical channel associated with the sidelink scheduling request transmission is same as or lower than a priority of an uplink logical channel associated with the uplink scheduling request transmission, and the uplink scheduling request transmission is associated with an uplink buffer status report to be accommodated in a media access control packet data unit after the sidelink scheduling request transmission; and cancel the sidelink scheduling request transmission in response to the priority of the sidelink logical channel being the same as or lower than the priority of the uplink logical channel.

5. The UE of claim 4, wherein the at least one processor is configured to cause the UE to:

cancel one or more pending sidelink scheduling request transmissions and one or more pending uplink scheduling request transmissions triggered prior to assembling the media access control packet data unit in response to the priority of the sidelink logical channel being the same as or lower than the priority of the uplink logical channel.

6. The UE of claim 4, wherein the at least one processor is configured to cause the UE to:

cancel one or more pending sidelink scheduling request transmissions and one or more pending uplink scheduling request transmissions triggered prior to assembling the media access control packet data unit except for the sidelink scheduling request transmission triggered by the sidelink buffer status report for the sidelink logical channel with the priority higher than the priority of the uplink logical channel associated with the uplink scheduling request transmission triggered by the uplink buffer status report.

7. The UE of claim 1, wherein the at least one processor is configured to cause the UE to:

determine a priority of the sidelink logical channel associated with the sidelink scheduling request transmission is the same as or lower than a priority threshold in response to an uplink buffer status report to be accommodated in a media access control packet data unit after the sidelink scheduling request transmission; and cancel the sidelink scheduling request transmission in response to the priority of the sidelink logical channel being the same as or lower than the priority threshold.

8. The UE of claim 7, wherein the at least one processor is configured to cause the UE to:

cancel one or more pending sidelink scheduling request transmissions and one or more pending uplink scheduling request transmissions triggered prior to assembling the media access control packet data unit in response to the priority of the sidelink logical channel being the same as or lower than the priority threshold.

9. The UE of claim 7, wherein the at least one processor is configured to cause the UE to:

cancel one or more pending sidelink scheduling request transmissions and one or more uplink scheduling request transmissions triggered prior to assembling the media access control packet data unit; and refrain from canceling one or more sidelink scheduling request transmissions triggered for the sidelink logical channel based at least in part on the one or more sidelink scheduling request transmissions having respective priorities higher than the priority threshold.

10. The UE of claim 1, wherein the at least one processor is configured to cause the UE to:

determine a highest priority of one or more sidelink logical channels associated with the sidelink buffer status report is higher than respective priorities of one or more uplink logical channels associated with an uplink buffer status report, wherein a media access control packet data unit comprises the uplink buffer status report after the sidelink scheduling request transmission; and prioritize the sidelink buffer status report during a logical channel prioritization procedure for assembling the media access control packet data unit in response to the highest priority of the one or more sidelink logical channels being higher than the respective priorities of the one or more uplink logical channels.

11. The UE of claim 1, wherein the at least one processor is configured to cause the UE to:

in response to a size of a media access control packet data unit being unable to accommodate an uplink buffer status report and the sidelink buffer status report, prioritize N logical channel groups with a highest priority in each of the uplink buffer status report and the sidelink buffer status report during a logical channel prioritization procedure for assembling the media access control packet data unit, wherein N is based on a user equipment implementation according to the size of the media access control packet data unit, N is greater than or equal to 1, and each logical channel group includes at least one logical channel.

12. The UE of claim 1, wherein the at least one processor is configured to cause the UE to:

in response to the sidelink scheduling request transmission and a triggered uplink scheduling request transmission to be transmitted at a same time, determine whether a priority of the sidelink logical channel associated with the sidelink scheduling request transmission is same as or lower than a priority of an uplink logical channel associated with an uplink scheduling request, and the uplink scheduling request transmission is associated with an uplink buffer status report to be accommodated in a media access control packet data unit after the sidelink scheduling request transmission;

cancel the sidelink scheduling request transmission and transmit the uplink scheduling request transmission in response to the priority of the sidelink logical channel being the same or lower than the priority of the uplink logical channel; and cancel the uplink scheduling request transmission and transmitting the sidelink scheduling request transmission in response to the priority of the sidelink logical channel being higher than the priority of the uplink logical channel.

13. The UE of claim 1, wherein the at least one processor is configured to cause the UE to:

in response to the sidelink scheduling request transmission and a triggered uplink scheduling request transmission to be transmitted at a same time, determine whether a priority of the sidelink logical channel associated with the sidelink scheduling request transmission is same as or lower than a priority threshold;

cancel the sidelink scheduling request transmission and transmit the uplink scheduling request transmission in response to the priority of the sidelink logical channel being the same or lower than the priority threshold; and cancel the uplink scheduling request transmission and transmit the sidelink scheduling request transmission in response to the priority of the sidelink logical channel being higher than the priority threshold.

14. The UE of claim 1, wherein the at least one processor is configured to cause the UE to:

in response to a radio link failure being detected on a unicast sidelink, cancel one or more pending scheduling request transmissions associated with the unicast sidelink.

15. A processor for wireless communication, comprising:
at least one controller coupled with at least one memory and configured to cause the processor to:
   trigger a sidelink buffer status report for a sidelink logical channel;
   trigger a sidelink scheduling request transmission in response to the sidelink buffer status report triggered for the sidelink logical channel;
   determine, prior to transmitting the sidelink scheduling request transmission, that a size of an uplink media access control packet data unit is large enough to accommodate the sidelink buffer status report;
   cancel, independent of an uplink scheduling request transmission associated with the uplink media access control packet data unit, the sidelink scheduling request transmission in response to determining that the size of the uplink media access control packet data unit is large enough to accommodate the sidelink buffer status report; and
   transmit the uplink media access control packet data unit, wherein the uplink media access control packet data unit comprises the sidelink buffer status report.

16. The processor of claim 15, wherein the at least one controller is configured to cause the processor to:
   cancel one or more pending sidelink scheduling request transmissions being triggered prior to assembling the uplink media access control packet data unit.

17. The processor of claim 15, wherein the at least one controller is configured to cause the processor to:
   determine whether an autonomous resource selection mode is configured; and
   cancel one or more pending sidelink scheduling request transmissions being triggered prior to assembling a media access control packet data unit in response to the autonomous resource selection mode being configured.

18. The processor of claim 15, wherein the at least one controller is configured to cause the processor to:
   determine a priority of the sidelink logical channel associated with the sidelink scheduling request transmission is the same as or lower than a priority of an uplink logical channel associated with the uplink scheduling request transmission, wherein the uplink scheduling request transmission is associated with an uplink buffer status report, and wherein a media access control packet data unit comprises the uplink buffer status report after the sidelink scheduling request transmission; and
   cancel the sidelink scheduling request transmission in response to the priority of the sidelink logical channel being the same as or lower than the priority of the uplink logical channel.

19. The processor of claim 18, wherein the at least one controller is configured to cause the processor to:
   cancel one or more pending sidelink scheduling request transmissions and one or more pending uplink scheduling request transmissions triggered prior to assembling the media access control packet data unit in response to the priority of the sidelink logical channel being the same as or lower than the priority of the uplink logical channel.

20. A method performed by a user equipment (UE), the method comprising:
   triggering a sidelink buffer status report for a sidelink logical channel;
   triggering a sidelink scheduling request transmission in response to the sidelink buffer status report triggered for the sidelink logical channel;
   determining, prior to transmitting the sidelink scheduling request transmission, that a size of an uplink media access control packet data unit is large enough to accommodate the sidelink buffer status report;
   canceling, independent of an uplink scheduling request transmission associated with the uplink media access control packet data unit, the sidelink scheduling request transmission in response to determining that the size of the uplink media access control packet data unit is large enough to accommodate the sidelink buffer status report; and
   transmitting the uplink media access control packet data unit, wherein the uplink media access control packet data unit comprises the sidelink buffer status report.

* * * * *